United States Patent [19]

Thakur

[11] Patent Number: 4,765,928
[45] Date of Patent: Aug. 23, 1988

[54] INTRINSICALLY CONDUCTIVE DOPED POLYMERS OF ENHANCED STABILITY

[76] Inventor: Mrinal Thakur, 55 Ash St., Waltham, Mass. 02154

[21] Appl. No.: 766,918

[22] Filed: Aug. 19, 1985

[51] Int. Cl.$^4$ .............................................. H01B 1/06
[52] U.S. Cl. .................................... 252/500; 252/518; 252/512; 524/80; 524/401
[58] Field of Search ..................... 252/500, 512, 518; 524/80, 401

[56] References Cited

U.S. PATENT DOCUMENTS

| | | | |
|---|---|---|---|
| 4,204,216 | 5/1980 | Heeger et al. | 252/500 |
| 4,222,903 | 9/1980 | Heeger et al. | 252/518 |
| 4,230,604 | 10/1980 | Wingrave | 252/518 |
| 4,269,738 | 5/1981 | Pez et al. | 252/500 |

*Primary Examiner*—Josephine Barr
*Attorney, Agent, or Firm*—Fay, Sharpe, Beall, Fagan, Minnich & McKee

[57] ABSTRACT

This invention relates to the discovery of a novel class of intrinsically electrically conductive doped solid organic homopolymers having a conductivity when measured by the four point probe method at standard temperature conditions within the range of about $10^{-3}$ to $10$ ohms$^{-1}$ cm$^{-1}$ developed by either treatment of the organic polymer surface with an electron donor or an electron acceptor dopant. The individual "mer" unit of the useful polymeric class of homopolymers for the purposes of accepting the dopant treatment consist of homopolymers having the repeating general structure:

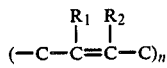

wherein the useful members of this class require that the $R_1$ and $R_2$ substituents in the illustrated structured "mer" are not both hydrogen substituents. However, in many instances of individual operative members of the class $R_1$ and $R_2$ may be otherwise a halogen or moities of a simple hydrocarbon structure, particularly methyl, when alkyl group extended chains, such as isopropyl, have been equated by theoretical comparison, likewise, it is also established that the simple phenyl (aromatic) group is also functionally useful. The "mer" units of the polymer are isolated which is in contrast with prior art polymers which have been suggested or useful which contain conjugated bond structures.

11 Claims, 1 Drawing Sheet

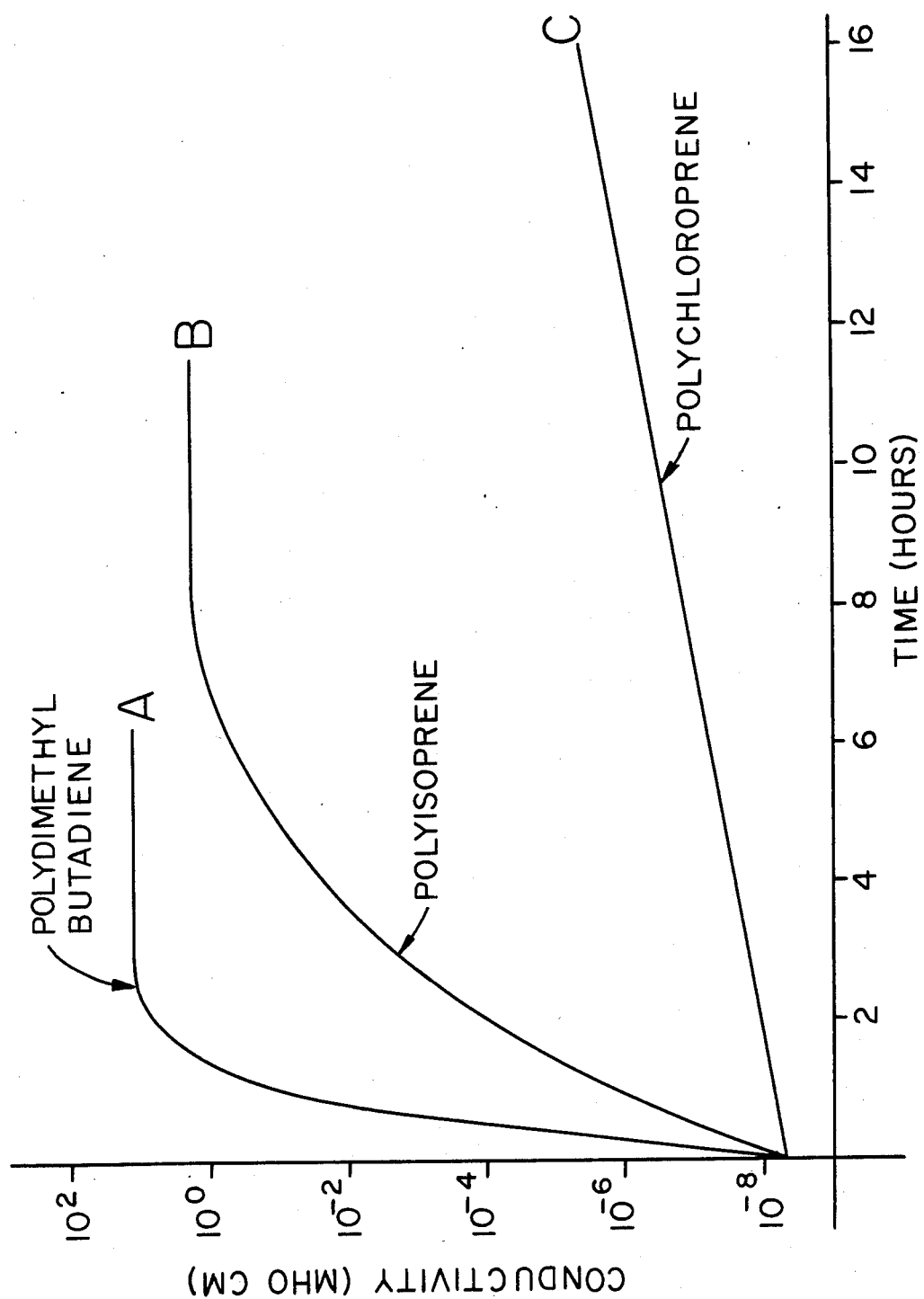

INTRINSICALLY CONDUCTIVE DOPED POLYMERS OF ENHANCED STABILITY

INTRODUCTION

The intrinsically conductive homopolymers of this invention have greater conductivity than compounds which are celebrated as being non-conductive having conductivities from $10^{-9}$ to $10^{-18}$ mhos per cm.

Most organic compounds which are solids are also known as non-conductors and have conductivities of the order of $10^{-6}$ to $10^{-15}$ mhos per cm. Nylon is said to have a conductivity, for example, of about $10^{-15}$ mhos per cm.

When doped, as is essential, the majority of intrinsically conductive polymers which embrace the novel compositions of this invention have a conductivity of from above $10^{-9}$ to about 10 mhos per cm. Electrical conductors as most commonly thought of have at room temperatures conductivities of the order greater than $10^3$ mhos/cm to super conductors at $10^{26}$ mhos/cm (lead metal at 4 degrees Kelvin).

The foregoing scale will be an aide in orientation to the nature of the (doped) intrinsically conductive polymers of this invention.

BACKGROUND OF THE INVENTION

Prior Art

Doped intrinsically conductive polymers have been authoritatively recognized as the "Hottest thing in modern physics". Organic polymers are generally recognized insulators of electrical current flow and are generally complex mixtures of microscopic crystalline and disordered or amorphous elements with no free electrons to carry charges through them. Recent discoveries of polymers having unsaturated carbon to carbon double bonds in the "mers" or repeating groups which are alternative with or "conjugated" in the known polymers, such as polyacetylene, poly(paraphenylene) and poly(p-phenylene sulfide) when treated or "doped" with electron donors or electron acceptor (dopants) have been found to produce conductive polymers.

Prior art conductive polumers have conductivities of the order of about $10^{-9}$ to about $10^3$ mhos(S) per cm. Most all known normal prior art polymers are effective insulators. Insulators normally exhibit conductivities of the order of $10^{-6}$ to $10^{-15}$ mhos(S) per cm. Illustratively nylon has a conductivity of the order of about $10^{-15}$ mhos per cm.

The prior art ppears to hve recognized that polymers made up of repeating units or "mers" where each of the units thereof exhibits a conjugated double bond structure, illustrated as ($-C=C-C=C-C=C$) were those most likely to display semi-conducting properties. Conductivities were found to be evaluated for some compounds in this class somewhere between good insulators and good conductors.

William A. Little of Stanford University proposed in 1965 theoretically that a conjugated polymer (as above) with selected substituents along the linear polymeric conjugated unsaturated backbone should provide a "super conductor". An inorganic polymer, polysulfurnitride, proved to be superconducting at about 0.5 degrees Kelvin.

The number of intrinsically conductive polymers known in the art are representatively very small. Those conductive polymers above have been most investigated and others are known to exist. "Conductive Polymers" (published 1982, Plenum Publishing Corp.) edited by Raymond Seymour provides additional detail of the prior art.

The commercial use of light weight intrinsically conductive polymeric materials to replace conductors and semi-conductors of known quality has, however, been seriously hampered by the inherent instability of the known prior art materials to withstand intimate contact with oxygen and with water, both of which are in ever-present contact with exposed surfaces not otherwise isolated therefrom by protective means.

The inherent instability of the known electrically conducting polymers has been and remains the major deficiency of prior art products. Additionally, the procedure for synthesis of the electrically conducting polymers of the prior art is highly specialized, relatively complicated and costly. Further, the mechanical properties are not particularly attractive for practical application and ultimate utility.

Further, the known conductive polymers are generally found to be insoluble and infusible which is a serious handicap in the formation of these polymers into various commercial complex forms and sizes. In some instances complex forms become difficult, if not impossible, to create.

It is well established in the published state of the art that the conductivity of intrinsically conductive polymers is greatly enhanced through use of dopants which may be either electron donors or electron acceptors. The polymer dopant interaction which leads to the conductivity of an organic polymer is not well understood and is open to a variety of interpretations.

There are two parallel theories or models and opinions to explain the dopant phenomenon. One is the Soliton model and the other is that of conductive islands embedded in a dielectric matrix.

The Solitron model proposed by Su, Schrieffer and Heeger has some experimental support (Physical Review Letter 43, 1532, (1979).

The second model supports the concept that the treatment of the polymer with dopants introduces conductive islands by charge transfer between the polymer backbone and the dopant atoms. Iodine, selected from among the known dopants for experimental use in this developmental work, being an electron acceptor becomes negatively charged by pulling electrons from the backbone and thereby the backbone in turn becomes conductive with positively charged holes.

The Soliton model, specifically in relation to the particular synthetic rubbery homopolymers of interest to this disclosure, does not appear to be clearly applicable. No physical misfit appears formable along the backbone, as could be supported in argument in the case of polyacetylene, the only prior art class of intrinsically conductive polymers described therein.

Prior art made of record in copending application U.S. Ser. No. 481,589, filed Apr. 4, 1983, presently relied upon includes Wingrave, U.S. Pat. No. 4,230,604 which describes treatment of a non-differentiated class of polymers with a conductive salt which is not generally understood to be a dopant treatment. Also of record in the same file are recognized doped prior art polymers which include Heeger, et.al. U.S. Pat. No. 4,204,216 and U.S. Pat. No. 4,222,903 and the prior art made of record in the relevant art therein of record. Also pertinent to the prior art of doped polymers are Pez U.S. Pat. No. 4,269,738.

The known pertinent prior art identified above does not embrace the class of doped homopolymeric rubbery precursor compositions herein disclosed and claimed.

While the polyenes (chain bridged acetylene) polyphenylenes (aromatic ring based polymers) and polyphenylene chalcogenides (sulfur bonded aromatic ring structures) are disclosed in the prior art as dopable polymers using electron acceptor and electron donor dopants, there is no suggestion that the homopolymers disclosed herein are capable of being similarly doped to form a novel class of conductive polymers.

BRIEF DESCRIPTION OF THE INVENTION

The initial reduction to practice of this invention came about through the successful doping of natural rubbers (polyisoprene). Polyisoprene is the principal rubbery component of natural rubber. Isoprene has been used extensively in the synthesis of synthetic rubbers.

Earlier attempts in our initial research to dope polybutadiene rubber established little or no success. This polymer is understood to have the basic "mer" structure:

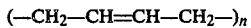

Note the exclusive hydrogen substitution of the double bond.

It is noted that the polybutadiene "mer" is characterized by a single carbon to carbon double bond structure in isolated form as opposed to all known prior art conductive polymers which are characterized by a polymer backbone having the general conjugate structure:

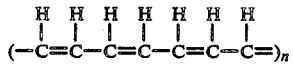

Note the consistent alternation of single and double bonded carbon atoms which are generally referred to in the art as "conjugated" double bonds in the backbone structure.

The discovery here made is that both cis and trans polyisoprene polymer was dopable where the material change over the above polybutadiene "mer" unit has the following "mer" or unit structure in the poly-"mer".

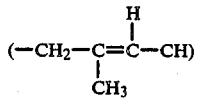

There are two clearly different and distinct aspects upon comparison of the inoperable polybutadiene "mer" unit with that of polyisoprene or natural rubber. An obvious difference is that the isolated double bonds of polyisoprene compared with the conjugated double bonds of polyacetylene. Another obvious difference is the presence of the substituent other than hydrogen in the polyisoprene structure in the carbon atoms of the isolated double bond. As the methyl group in polyisoprene can be considered electron donating, the electron density around the carbon to carbon double bond may thereby be increased giving rise to conductivity enhanced by doping.

An initial survey of the electrical conductive properties of natural and synthetic rubbers having established the improvement in stability upon exposure to oxygen and water over an extended period of time and the promising improvement in electrical conductivity upon doping with the halogen, iodine, of other natural and synthetic rubbers available from commercial sources were studied. Germany had produced artificial rubber on a commercial scale from dimethylbutadiene, commonly called methyl rubber. If one methyl group appeared to be significant, reason suggested two would be of theoretical interest. Samples were obtained. These methyl rubbers of commerce were subjected to doping with iodine (limited facilities prevented use of more toxic dopants). It was found that methyl rubber, or di-methyl rubber, to define over polyisoprene rubber, not only developed a higher level of conductivity upon doping, but developed it upon shorter exposure than had been the case with polyisoprene!

It became clearly apparent that an isolated double bond structure substituted with groups along the backbone other than hydrogen were capable of not only modifying but enhancing charge transfer. (See Example 9)

A brief consideration of available sample rubber polymers from supply houses drew attention to chloroprene. Neoprene, polymerized chloroprene, had the single isolate double bond structure desired in the backbone structure, and was also known to be an inherently weather resistant durable polymer when in the non-conductor or insulating form. Should this molecular structure be found to be responsive to electron transfer enhancement of doping, there would be established a further knowledgeable step towards development of practical conductive polymers whose useful lives were not dependent upon their durability and upon their guarded existance in protective inert atmospheres!

Samples of neoprene were obtained and subjected to iodine exposure at room temperature to begin. Conductivity was increased, but more slowly, so that after much longer periods of exposure and preferably at elevated temperatures (greater energy input), it was established that useful levels of conductive polymers could also be obtained from the neoprene (chloroprene) rubbers of commerce.

FIG. 1 is a schematic reproduction of the comparative levels of conductivity obtained in the foregoing discussion. While not intended as inclusive, FIG. 1 illustrates the comparisons of the useful polymers which were, by nature, insulators but which established, as a matter of fact, that conductive polymers could be obtained from rubbery homopolymers of the prior art heretofore not known to be subject to charge transfer induction through a variety of known and pre-established doping procedures.

From the foregoing studies it has now been established and known that butadiene rubbers, which are possessed of backbone chains devoid of charge transfer-conductive behavior, are markedly changed to useful conductive polymers by advent of a substituent R group in the "mer" unit in conjunction with the insulated

group and other than hydrogen even though the said backbone has only an isolate double bond structure.

Investigation of the available natural and synthetic rubbers having a single isolate double bond instead of the conjugated double bond structure heretofore characteristic of the known conductive polymers established that those having a substituent group attached to the isolated double bond carbons of the "mer" units of the polymer other than hydrogen established their conductivity and increased their utility for that purpose. This has also been specifically established in particular with both a single and double methyl group substituents as well as a chloro substituent on the isolated double bond carbon atoms of the said "mer". Other substituent groups were not available (as samples of useful polymers) for testing from known suppliers.

Weather tests of over six months duration having established the lack of sensitivity of these useful doped polymers to deterioration and conductivity loss due to oxygen or water effect upon and after introducing charge transfer capability in their polymer molecules.

Theoretically it is also reasonable to predict that when presently unavailable and unknown sources of polymers modeled on di-methyl rubbers, neoprene rubbers and natural and synthetic polyisoprene rubbers, that combinations and permutations of substituents other than hydrogen on the isolated double bond carbon structure of the "mers" constituting the polymer are dopable to enhance thereby the charge transfer within the backbone and provide an infinite variety of permutations and combinations of conductive polymers having enhanced resistance to deterioration due to oxygen and water characteristics of the prior art polymers based on a conjugated double bond structure presently shown as essential to polymer conductivity and enhancement by charge transfer doping procedures.

Substituent groups believed to be material to replace the hydrogen atoms of polybutadiene as predictable from the now state of the art include methyl groups, phenyl groups and halogen groups. A logical extension based on CNDO/2 computations suggests that methyl may well include ethyl and isopropyl. Further dual combinations and/or selected combinations of the above substituents can be expected to enhance the slower quality of acceptance of doping found in the case of the single halogen (chlorine) substituent polymer as herein recorded in the case of neoprene.

Example 9 has been additionally comparative mathematical proof of the above statement based upon these calculations, based upon the prior affidavit in the parent case.

SUMMARY OF THE INVENTION

In researches relating to the known prior art and using polyacetylene and poly-p-phenylene as examples of polymers capable of showing considerable electrical conductivity, it was noted that the first was structurally characterized by a conjugated olefinic chain and the latter was, similarly, a conjugated aromatic chain. It was also known in the art, that the conductivity of these polymers would be markedly enhanced by several orders of magnitude if they were altered by treatment with established dopants.

The invention here is not related to the loading of non-conducting polymers with electrically conductive particulates such as carbon black, conductive whiskers, conductive metallic salts (Wingrave, U.S. Pat. No. 4,230,604), etc., but subsequent use of such loading to additionally increase or modify the charge transfer character of the conductive polymers of this invention is not precluded.

The important contribution made by this invention in the advancement of the art of conductive polymers is the provision of conductive polymers which are strongly resistant to deterioration by exposure to the elements, and particularly to oxygen and water.

The natural and synthetic rubbery homopolymers embraced by this invention have been extensively used in normal, prior art known ends for an appreciable period of time. The details of commercial fabrication of finished products is well developed and these rubbers can be readily manufactured in any form desired prior to doping or prior to being heated with known dopants to produce electrically conductive products.

The general raw materials essential to their manufacture are available in tonnage quantities and the diversity of end uses for the conductive homopolymers of this invention can not be exhausted through a formidable listing.

The vast range of electrical applications can be designed and fabricated before doping to provide maximum freedom of development and use of known production techniques.

Doping is understood to change the electron distribution along the polymer backbone which can be observed by a shifting of the infra-red bands. The tensile strength is generally enhanced by doping. Trans polyisoprene, for example, can be modified by control of processing conditions and highly crystalline, light weight, structures can be produced. As the substance is highly crystalline, single macroscopic crystals can be developed. Use of such crystalline material suggests application in diodes, transistors and integrated circuits. Economics would appear favorable to developments in this direction.

A major market is obvious in the field of Electromagnetic Interference shielding and Radio Frequency Interference shielding. Camouflaging military equipment including airplanes and tanks seems possible so that they are no "seen" by radar.

Inherently conductive polymers have been under investigation for over a decade. None have been a commercial success. E.M.I. shielding is a present problem in computer technology and cost-effective E.M.I. coatings are not presently available. Shielding integrity at the juncture between mating parts of an electronic housing has been reported as an unsolved problem.

Schottky Barrier type solar cells are a sandwich type device which so far have required measurements during testing to be taken under inert flowing nitrogen gas to prevent oxidation. Devices using semi-conductive polyacetylene in the configuration Al/doped $(CH_2)_n$/Au have been fabricated. The conductive polymers of the invention here disclosed should not require an inert gas shroud to keep the solar cell from oxidation.

Light weight batteries and solar cells appear to have increased commercial applications wherein the dopant of one pole is an electronic acceptor ($AsF_5$) and the other pole is an electron donor (sodium naphthalide).

Applications in the electro-photographic field suggest themselves. Elements can be fabricated which are non-conducting in the absence of light and conductive in the presence of light.

As the known dopants disclosed in the prior art of record are known to have gradations of effectiveness on the conductivity level of intrinsically conductive polymers, selection from the variety of known dopants of the amount and kind and the conditions for doping offer a variety of available means for conductivity level control. Arsenic pentafluoride has been demonstrated to have about three orders of greater magnitude of effectiveness as compared to iodine. However, control of the dopant phase is critical to safety in application, as here limited by laboratory availability.

Dopants useful herein have been disclosed in the prior art of record known or useful in treatment of intrinsically conductive homopolymers of the prior polyacetylene art and art not recognized as including electron donor dopants and electron acceptor dopants (Heeger, et.al., and Pez). Salts (Wingrave) are not shown as dopants in this relevant art.

Trans-polyisoprene polymers as have been used hereunder are commonly available having a level of crystallinity of the order of 28%. Prior art work with polyacetylenes has established that as the level of crystallinity of the polymer is increased by control of processing conditions, higher levels of conductivity result. It is, therefor, deemed reasonable to presume trans-polyisoprene crystallinity can be increased along with the conductivity level. The related homologues of polyisoprene (not presently available for trials) open the door to modified homologous substituents as further homopolymer modification to produce specific conductive qualities for specific end uses.

Heretofore, the conductive polymers including polyacetylene, poly(paraphenylene) and poly(paraphenylene sulfide) have been extensively studied. As these polymers are often both insoluble and infusible, manufacture into specific forms is usually difficult and often impossible. The compositions of this invention have been made into coatings by pre-solution in volatile organic solvents of the selected polymers prior to doping which inherently form fluidized liquid coatings which dry to form solid conductive coatings having protective value.

Spacecraft are known to experience severe electrostatic charging during geosynchronous orbit by charged particle fluxes. Doped conductive polymers a few microns thick are being studied under conditions which simulate both terrestrial and space environments. Stability is the principal obstacle to such uses. The products of this invention appear to be of interest.

Rechargeable storage batteries have been described of three principal types which can employ conductive doped polymers. One type the anode only discharge reaction involves the conductive polymer, a second involves only the cathode as the discharge reaction polymer and the third embraces those where both the anode and cathode discharge reactions involve the conductive polymer. These, too, appear to provide utility for the conductive polymers here described.

While there is no intention to be bound by theory, it is reported in the chemical art that isolate double bonds function independently of one another, but that conjugated double bonds function as an entity.

It is possible that the conjugation of the double bonds explains deterioration of the prior art conductive polymers and the greater stability observed in the doped conductive polymers here, which have only isolate double bond structure in the "mer" units.

Use of the conductive polymers of this invention in physical admixtures has been conceived of where higher conductivity may be desired and some deterioration from prior art conductive polymers may be tolerated.

Roofing products where the dual value of protection of the building from rain and the weather, but economic recovery of solar energy may be realized through solar collectors and storage batteries are conceptually fabricated with conductive polymers of this invention.

It is also conceived that the conductive polymers of this invention may be used in development of anti-static fibers, illustratively for use in carpets, etc., where static charges are objectionable. Trans polyisoprene is suggested for this end use. Gutta percha or balata are principally of this form.

The following examples are illustrative of various species of isolated double bond rubbery polymers which establish actual and constructive reduction to practice of this invention.

EXAMPLE 1

Films of thicknesses approximating 2 mm of cis-polyisoprene (Natsyn 2200 lot 20517F, Goodyear Chemicals, Akron, Ohio) were prepared. The prepared samples of about 4 cm×2 cm×2 mm thickness were placed in a recloseable glass vessel at about 25 degrees C. (room temperature) in the presence of iodine vapors for about ten hours. The films blackened and became electrically conductive. Some loss of resilience was noted.

EXAMPLE 2

A sample of polybutadiene rubber, similar to that prepared in Example 1, was exposed to iodine vapors in a closed glass vessel (petri dish) at about 50 degrees to 60 degrees C. and normal pressures by heating iodine crystals. Polybutadiene has the general conjugated "mer" structure involving conjugated double bonds with no substituent groups, other than hydrogen, along the linear polymeric backbone. The evidence of any doping activity was negligible. The color was not appreciably altered. No significant improvement in conductivity was found. After exposure of about 12 hours the conductivity was less than about $10^{-8}$ mhos/cm.

EXAMPLE 3

An effective electrically conductive paint was made from a rubber cement consisting essentially of cis-polyisoprene dissolved in hexane containing trace amounts of an unidentified resin (Sanford Corporation, Bellwood, Ill.). The rubber cement was further reduced with hexane (toluene can be used when the trans-polyisoprene is employed) and 10–15% by weight of iodine incorporated as the dopant.

Drawdowns of the order of thin films (0.5 mm) of doped trans-polyisoprene films were highly uniform and of an electrically conductive nature. Use in magnetic disks, etc., is superior to polyurethane which is lacking in uniformity and undergoes rapid degradation due to static charge accumulation.

EXAMPLE 4

Rubber bands established to contain predominantly cis 1,4 polyisoprene (gum) (Heavy duty red rubber bands from Keener Rubber Co., Alliance, Ohio) had typical cross sections of approximately 1 mm×1 mm and were cut into 4–5 cm lengths.

A number of these sections were placed in a petri dish in conjunction with a supply of iodine crystals at room temperature (25 degrees C.). The dopant diffused into the polyisoprene sections over about twelve hours.

Upon removal for examination the doped rubber bands had lost elasticity having become relatively more rigid after the exposure. A four point probe conductivity reading established the conductivity after doping to be in the order of one mho/cm. From the fact that doping can follow fabrication of the polyisoprene gum rubber, it is clear that rods, wires, tubes and endless uniform sheets may be first made and be useful as very light weight electrical conductors in antistatic wraps, E.M.I. shieldings and other functional uses heretofore impractical because of the sensitivity of conductive rubbers heretofore known in the art to rapid deterioration due to oxygen and water exposure.

EXAMPLE 5

Samples of methyl rubber (poly 2,3-dimethyl butadiene) were purchased from PolyScience, Inc., (Warrington, PA) and cut into similar rectangular pieces of about 1 cm×3 cm×2 cm and of pale color. The conductivity as received was less than $10^{-8}$ mhos/cm.

These samples were likewise doped (using iodine as the dopant) by exposure of the samples in a closed petri dish at room temperature for 10-12 hours. After doping, the color became opaque black and the conductivity had increased to 10 mhos/cm.

A melt adhesive having promising commercial value for conductive end uses was prepared by a melt processing wherein a methyl rubber polymer of commercial material at a temperature of about 45 degrees C. was maintained in intimate contact with iodine vapors over a 10 hour period.

EXAMPLE 6

Encouraged by the successful doping of 2-dimethyl butadiene and its excellent conductivity; and aware of the excellent mechanical and chemical properties of polychloroprene having the general structure:

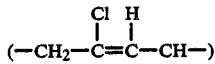

a sample which identified as 85% trans and 15% cis, was obtained. (Scientific Polymer Products, Inc., NY)

Similar testing with iodine as the dopant established longer doping times were essential as compared with prior methyl substituted butadiene polymers. However, after about 36 hours at room temperature a four point conductivity test established a conductivity of the doped polymer between about $10^{-2}$ to $10^{-1}$ mhos/cm.

As it is established in the known art relating to intrinsically conductive polymers (polyacetylene and poly p-phenylene) higher conductivities are generally obtained with the use of arsenic penta fluoride ($AsF_5$) replacing iodine as the dopant.

Use of the latter dopant required specialized safety precautions, therefor this invention has been reduced to practice with iodine as the dopant.

It is also well established that dopants may be either electron donors or electron acceptors. Conductivity control over 17 orders of magnitude has been reported with partially chain oriented polyacetylene with AsF as the dopant. Extensive experimental development with the dopant phase as reflected in the state of the art, gives promise of considerable control of the impressed electrical conductivity potential herein.

Trans polyisoprene samples in the form of pellets (catalog no. 073 from Scientific Polymer Products, Inc.) were doped with iodine as previously. Sheets are available (PolyScience Inc., Warrington, PA) to design E.M.I. and R.F.I. shieldings. It is normally employed as an insulating layer in power cables. When doped as described herein hollow thick cylinders may be manufactured via melt processing. Following the disclosure herein, the inner surfaces of the tube are doped. As the dopant effect upon the exposure surface is maximum, one thereby manufactures a cylinder the outer thicknesses of which are not doped and remain insulating while the inner radii are conductive. Such products are an advance over the prior art cable sheathings which are made by loading trans polyisoprene with carbon black where conductivity is not uniform, the composition is relatively unstable and the compatibility with non-loaded trans polyethylene mass of insulating nature is minimal.

EXAMPLE 8

Homogenous doping of cis polyisoprene is obtained by dissolving the polymer in hexane to which 10-15% by weight iodine is commingled. Trans polyisoprene can be similarly dissolved in toluene as the solvent.

Magnetic disks, superior to those employing polyurethane, are made by evaporating thin (0.5 mm) dry films of the trans polyisoprene solution after coating thereon which are highly uniform and conductive. Conductivity of such films as above described are of the order of 100 times greater than is essential for either E.M.I. or R.F.I. shielding. As radar employs radio waves, shielding of conductive objects be effective covering their surfaces with similar coatings as above should make such objects undetectable by radar.

EXAMPLE 9

Samples of known and natural rubbery homopolymers rubbers as described herein were obtained as available from commercial sources.

All of the so available samples were further identified by their chemical and physical structure for purposes of study and evaluation.

All of the above homopolymers in the group were identified as falling within the general unit butadiene structure as follows:

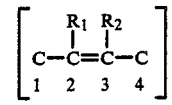

Actual trials of said available samples established that when $R_1$ and $R_2$ substituents are both hydrogen, as in the case of butadiene, the sample is not made appreciably conductive as disclosed herein where heated with the known prior art dopants, (here using iodine as a representative dopant of said general class).

However, when the $R_1$ and $R_2$ substituents may otherwise contain one substituent that is a hydrogen group and the other or both groups are is selected from the group consisting of those shown in the following table, the partial charges and the dipole moments can be calculated by computer by the CNDO/2 method (method used as detailed in "Semi-empirical Methods of Electronic Structure Calculation" by G. A. Segal, Plenum Press, N.Y. 1977).

The partial charges at the unsaturated sites $R_1$ and $R_2$ for the two different potential R substituents at 2 and 3 positions can be calculated.

The data herein is abstracted from the Affidavit of the Inventor originally made a part of the parent copending application file (U.S. Ser. No. 481,589, filed Apr. 4, 1983) now abandoned and dated Dec. 23, 1983, which is incorporated herein in part by reference as to the completed tables of data therein set out in completed form.

TABLE I

[The data as abstracted therefrom is set out below:]

| Polymer Ident. Substituents | $R_1$ Substituents | $R_2$ | Substituent Charge Density at carbon of $R_1$ and $R_2$ | |
|---|---|---|---|---|
| Butadiene (hydrogen) | H | H | −.006 | −.006 |
| Isoprene (methyl) | $CH_3$ | H | +0.034 | −0.031 |
| Ethyl Rubber | $C_2H_7$ | H | +.027 | −.028 |
| Isopropyl Rubber | $C_3H_7$ | H | +.024 | −.027 |
| Phenyl Rubber | $C_6H_5$ | H | +.035 | −.031 |
| Chloroprene | Cl | H | +.224 | −.020 |

Table I provides date establishing that the partial charges of the variously indicated substituent $R_1$ and $R_2$ groups in the correlated polymer identifications when calculated by CNDO/2 method indicates that butadiene rubber (having negligibly low density at $R_1$ and $R_2$ carbon atom substituent groups) indicates an inoperative condition to produce a doped (conductive) product.

Inoperability was confirmed by the test data obtained from actual examples. Isoprene, the first of the commercial available samples, clearly established that the methyl substituent (having more than six times the charge density as shown) successfully provided a useful level of electrical conductivity upon dopant treatment.

The chloroprene homopolymer rubber sample was exceptional both in the extent of developed charge density calculated, as well as demonstrated in actual dopant trials.

Thus, where it was possible to check the actual sample of commercially available rubbery homopolymer samples as treated, with the dopant in a trial run and compare results with the data as calculated by the CNDO/2 charge density calculations as identified, confirmation of calculated vs. actual tests of the above substituents was clearly established. There was complete correction with dopant treated samples as to conductively so induced.

One observes that dopants are developed and employed, as in the case of applicant, where homopolymers are those illustrative of the intrinsically conductive polymers made conductive thereby. The prior art (Wingrave) uses salts to obtain conductivity by loading which are random polymers, copolymers, esters, etc. of various monomers.

Conductivity of known intrinsically conducting polymers increases with the increased crystallinity of the conductive polymer. Commercially available trans polyisoprene available for purposes of these examples have a crystallinity of only 28%.

Increasing the crystallinity by known processing conditions has confirmed an increase in the conductivities of the polymers such as trans polyisoprene. Further crude experimentation has established that as little as 2 to 3% of iodine dopant in the polymer is sufficient to increase the conductivity of the intrinsically conductive polymers disclosed herein. The amount of iodine dopants present in the examples, however, has been calculated at 10–15% by weight of the polymer.

Somewhat higher temperatures are known to accelerate the rate of change of conductivity during the dopant step. Other methods of doping shown in the prior art are not to be precluded by the foregoing examples which have principally been limited to iodine for convenience and safety. However, such is not a utility limitation where safety measures can be properly monitored.

Having illustrated the best modes of reduction to practice of the invention available at the time of preparation of these examples, the inability to illustrate all the useful forms of the invention by actual example is not to be construed as limiting upon the disclosure.

In a study of the temperature dependent of the conductivity of the doped polymers of this invention that conductivity decreases as the temperature is decreased. This dependence correlates characteristically with semi-conductors.

What is claimed is:

1. An electrically conductive doped, solid organic homopolymer characterized by an electrical conductivity when measured by the four point probe method at standard temperature reading within the illustrative range of $10^{-9}$ to $10^2$ mhos/cm., said conductive polymeric composition comprising a dopant treated homopolymer, the mer units thereof each having the chemical structure:

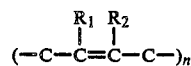

wherein $R_1$ and $R_2$ are selected from the class consisting of hydrogen, halogen and hydrocarbon moieties: wherein when $R_1$ or $R_2$ is specifically hydrogen substituted the remaining $R_1$ or $R_2$ is selected from the class consisting of halogen and hydrocarbon moieties; in which case the halogen is selected from the group consisting of chlorine, bromine, and iodine and said hydrocarbon moiety consists of methyl, ethyl, propyl and phenyl groups; with the added proviso and limitation relative thereto that in no instance are both $R_1$ and $R_2$ mutually hydrogen substituted: and said dopant is selected from the dopant class consisting of electron donor dopants and electron acceptor dopants.

2. The electrically conductive homopolymer of claim 1, wherein the homopolymer is a polychloroisoprene polymer.

3. The conductive homopolymer of claim 1 wherein the homopolymer is a polyisoprene homopolymer.

4. The conductive homopolymer of claim 1 wherein $R_1$ is a hydrogen atom and $R_2$ is a halogen atom.

5. The conductive polymer of claim 1, wherein $R_1$ is a hydrogen atom and $R_2$ is a aliphatic hydrocarbon moiety having not more than three carbon atoms.

6. The conductive polymer of claim 1, wherein $R_1$ is a hydrogen atom and $R_2$ is a methyl group.

7. The conductive polymer of claim 1, wherein both $R_1$ and $R_2$ are methyl groups 8. The conductive polymer of claim 1 wherein $R_1$ is a hydrogen atom and $R_2$ is a phenyl group.

9. The conductive polymer of claim 1 wherein the dopant treatment comprises elemental iodine.

10. The conductive polymer of claim 1 wherein $R_1$ is a hydrogen group and $R_2$ is a chlorine group.

11. The electrically conductive doped solid organic homopolymers of claim 1, further characterized by an electrical conductivity of the selected homopolymer within the range of $10^{-3}$ to $10^2$ mhos per cm.

* * * * *